US008464161B2

(12) United States Patent
Giles et al.

(10) Patent No.: US 8,464,161 B2
(45) Date of Patent: Jun. 11, 2013

(54) MANAGING PERMISSIONS IN A COLLABORATIVE WORKSPACE

(75) Inventors: Jason D. Giles, Seattle, WA (US); Alixandra M. Han, Seattle, WA (US); Ulrike A. Anders, Chicago, IL (US)

(73) Assignee: Microsoft Corporation, Redmond, WA (US)

( * ) Notice: Subject to any disclaimer, the term of this patent is extended or adjusted under 35 U.S.C. 154(b) by 983 days.

(21) Appl. No.: 12/136,074

(22) Filed: Jun. 10, 2008

(65) Prior Publication Data

US 2009/0307604 A1 Dec. 10, 2009

(51) Int. Cl.
*G06F 3/14* (2006.01)
*G06F 3/17* (2006.01)

(52) U.S. Cl.
USPC ............. 715/751; 716/11; 716/137; 345/419; 345/581; 709/204; 709/206; 705/39; 707/9

(58) Field of Classification Search
USPC .......... 715/200–277, 700–867; 700/701–866; 709/201–229; 705/50–79, 39; 345/30–111; 707/9
See application file for complete search history.

(56) References Cited

U.S. PATENT DOCUMENTS

| | | | |
|---|---|---|---|
| 5,107,443 A | 4/1992 | Smith et al. | |
| 5,533,183 A | 7/1996 | Henderson et al. | |
| 6,289,460 B1 | 9/2001 | Hajmiragha | |
| 6,564,246 B1 | 5/2003 | Varma | |
| 6,629,129 B1 | 9/2003 | Bookspan et al. | |
| 6,744,447 B2 | 6/2004 | Estrada et al. | |
| 7,233,951 B1 | 6/2007 | Gainer et al. | |
| 7,546,571 B2 * | 6/2009 | Mankin et al. | 716/137 |
| 7,609,257 B2 * | 10/2009 | Wright et al. | 345/419 |
| 7,933,952 B2 * | 4/2011 | Parker et al. | 709/204 |
| 2003/0046134 A1 | 3/2003 | Frolick et al. | |
| 2003/0065722 A1 | 4/2003 | Ieperen | |
| 2003/0120593 A1 * | 6/2003 | Bansal et al. | 705/39 |
| 2003/0135565 A1 * | 7/2003 | Estrada | 709/206 |
| 2004/0088647 A1 | 5/2004 | Miller et al. | |
| 2004/0128150 A1 | 7/2004 | Lundegren | |
| 2005/0010640 A1 | 1/2005 | Cannata et al. | |
| 2005/0097440 A1 | 5/2005 | Lusk et al. | |
| 2005/0114475 A1 | 5/2005 | Chang et al. | |
| 2005/0138566 A1 | 6/2005 | Muller et al. | |
| 2005/0160145 A1 | 7/2005 | Gruen et al. | |
| 2005/0216556 A1 | 9/2005 | Manion et al. | |

(Continued)

FOREIGN PATENT DOCUMENTS

KR 2003-0093871 A1 12/2003

OTHER PUBLICATIONS

Search Report and Written Opinion for PCT/US2009/043039, international filing date May 6, 2009, mailing date Dec. 23, 2009, 12 pages.

(Continued)

*Primary Examiner* — Ruay Ho
(74) *Attorney, Agent, or Firm* — Turk IP Law, LLC

(57) ABSTRACT

An approach for managing permissions in a collaborative workspace involves providing a permissions user interface presentation without loosing a context associated with a collaborative workspace user interface presentation. The permissions user interface presentation visually organizes a set of workspace members into two or more permission level categories. The permissions user interface presentation also allows a user to efficiently add new workspace members from a local system or an alternative system.

19 Claims, 13 Drawing Sheets

U.S. PATENT DOCUMENTS

| | | | |
|---|---|---|---|
| 2006/0026502 | A1 | 2/2006 | Dutta |
| 2006/0036692 | A1 | 2/2006 | Morinigo et al. |
| 2006/0080432 | A1 | 4/2006 | Spataro et al. |
| 2006/0101368 | A1* | 5/2006 | Kesarwani et al. ............. 716/11 |
| 2006/0123347 | A1 | 6/2006 | Hewitt et al. |
| 2007/0165044 | A1* | 7/2007 | Wells et al. ................... 345/581 |
| 2007/0168340 | A1 | 7/2007 | Mahoney et al. |
| 2007/0233811 | A1 | 10/2007 | Rochelle et al. |
| 2007/0288292 | A1 | 12/2007 | Gauger |
| 2008/0005235 | A1 | 1/2008 | Hegde et al. |
| 2008/0104052 | A1 | 5/2008 | Ryan et al. |
| 2008/0320000 | A1* | 12/2008 | Gaddam ........................... 707/9 |

OTHER PUBLICATIONS

Search Report and Written Opinion for PCT/US2009/043424, international filing date May 11, 2009, mailing date Dec. 23, 2009, 11 pages.

Pankoke-Babatz, et al., "Collaborative Workspaces for Time Deferred Electronic Cooperation," Proceedings of the International ACM SIGGROUP Conference on Supporting Group Work: the Integration Challenge, 1997, pp. 187-196.

Bentley, et al., "Supporting Collaborative Information Sharing with the World Wide Web: The BSCW Shared Workspace System," Proceedings of the 4th International WWW Conference, Issue 1, Dec. 1995, pp. 63-74.

Müldner, et al., "An Experiment with Computer-Supported Cooperative Work: Shared Workspace," WebNet 1999, Association for the Advancement of Computing in Education (AACE), 1999, pp. 788-793.

Tsai, et al. "A Document Workspace for Collaboration and Annotation Based on XML Technology," Proceedings International Symposium on Multimedia Software Engineering, May 2000, pp. 165-172.

Adler, et al. "Evaluating and Implementing a Collaborative Office Document System," Interacting with Computers, vol. 18 Issue 4, Jul. 2006, pp. 665-682.

Tsai, et al. "A Document Workspace for Collaboration and Annotation Based on XML Technology," Proceedings International Symposium on Multimedia Software Engineering, 2000, pp. 165-172.

* cited by examiner

MANAGING PERMISSIONS IN A COLLABORATIVE WORKSPACE

BACKGROUND

A collaborative workspace (henceforth "workspace") refers to functionality that allows individuals to work on a shared task in a coordinated fashion. A typical workspace defines permissions which identify a collection of members who are permitted to interact with the workspace. The permissions also define the manner in which the respective members are permitted to interact with the workspace. The workspace also commonly defines a collection of items (e.g., document items, data items, etc.) associated with the workspace. In operation, authorized members may engage the workspace (in a manner defined by the permissions) to work on the shared items in a coordinated fashion.

In one approach, a user may create permissions by accessing a separate administrative user interface presentation outside the context of the collaborative workspace. The separate administrative user interface presentation may present a flat list of individuals. The user can scan this list and pick out, one user at a time, individuals who shall be granted access to a workspace (thus becoming members of the workspace). The user may also assign permissions to the selected individuals using this administrative user interface presentation.

The above approach has potential shortcomings. For instance, the user may find it a burdensome and disruptive task to access and interact with the separate administrative user interface presentation. For instance, the user may find it difficult to scan a long list of individuals. Further, since the list is flat, the user may find it difficult to quickly discern the permissions assigned to various individuals in the list. Further still, the user may find that the list does not encompass the complete universe of individuals with which the user may wish to interact. To remedy this issue, the user may decide to access yet other types of systems (having their own unique user interface presentations and protocols for managing individuals). These additional operations may increase the complexity of creating and managing permissions. The above-described approach may have yet further shortcomings.

The above potential drawbacks may discourage a user from defining robust permissions for a workspace. For instance, the user may decide to assign permissions to members in a relatively broad-brush and general fashion. This tactic, however, may compromise the security of the resultant workspace.

SUMMARY

An approach is described for managing permissions in a collaborative workspace. According to one illustrative implementation, the approach entails providing a workspace user interface presentation to a user through which the user may interact with the collaborative workspace. In response to the user's instruction, the approach presents a permissions user interface presentation to the user without losing a context associated with the workspace user interface presentation.

According to another illustrative feature, the permissions interface presentation visually organizes a set of workspace members into groups corresponding to two or more permission level categories. The two or more permission level categories are associated with different respective levels of access to the collaborative workspace.

According to another illustrative feature, the approach allows the user to change a permission level of at a workspace member from an original permission level category to a target permission level category. In one implementation, this operation involves performing a drag-and-drop operation to graphically move the workspace member from the original permission level category to the target permission level category. The user may also activate additional information regarding a workspace member and change the permission level of this member by acting on the additional information.

According to another illustrative feature, the approach allows the user to add a new member to the existing set of workspace members. The new member may be associated with a local system or an alternative system. In the former case, the approach displays a list of local system persons who are associated with the user. The user can select one or more these local system persons as new members of the collaborative workspace. In the latter case, the approach allows the user to select the alternative system from which new members will be selected. In response, the approach displays a list of alternative system persons who are associated with the user. The user can select one or more of these alternative system persons, changing their status to local system persons. At this time, the user can select one or more of the local system persons as new members of the collaborative workspace in the manner described above.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure describes an approach for managing permissions in a collaborative workspace through a permission user interface presentation. The permissions user interface presentation is provided to the user without losing context with other user interface presentations associated with the collaborative workspace. Further, the permissions user interface presentation visually organizes an existing set of workspace members into two or more groups associated with different respective permission level categories. Permissions can be changed by moving members from one permission level category to another. Further, the permissions user interface presentation provides functionality that allows a user to add new workspace members to the existing set of workspace members. The new members can be selected from either a local system or an alternative system using the same permissions user interface presentation tool.

By virtue of this approach, a user can effectively discern and modify the permissions associated with the collaborative workspace. The approach also provides a streamlined and user-friendly way to add new members to an existing set of workspace members. More generally, the concepts disclosed herein may address one or more of the challenges or problems previously noted, but are not limited to addressing all or any of these challenges or problems.

As used herein, the term "user" is used to describe the person who performs the process of managing permissions using the above-summarized approach. The term "members" refers to individuals who are assigned rights to access and interact with the workspace through the permissions. The person who manages permissions (e.g., the user) will typically also be defined as a member, although need not be.

This disclosure is organized as follows. Section A describes illustrative systems for managing permissions in a collaborative workspace. Section B describes illustrative methods for performing the same function. Section C describes illustrative processing functionality that can be used to implement any aspect of the features described in Sections A and B.

A. Illustrative Systems

Figure 13:
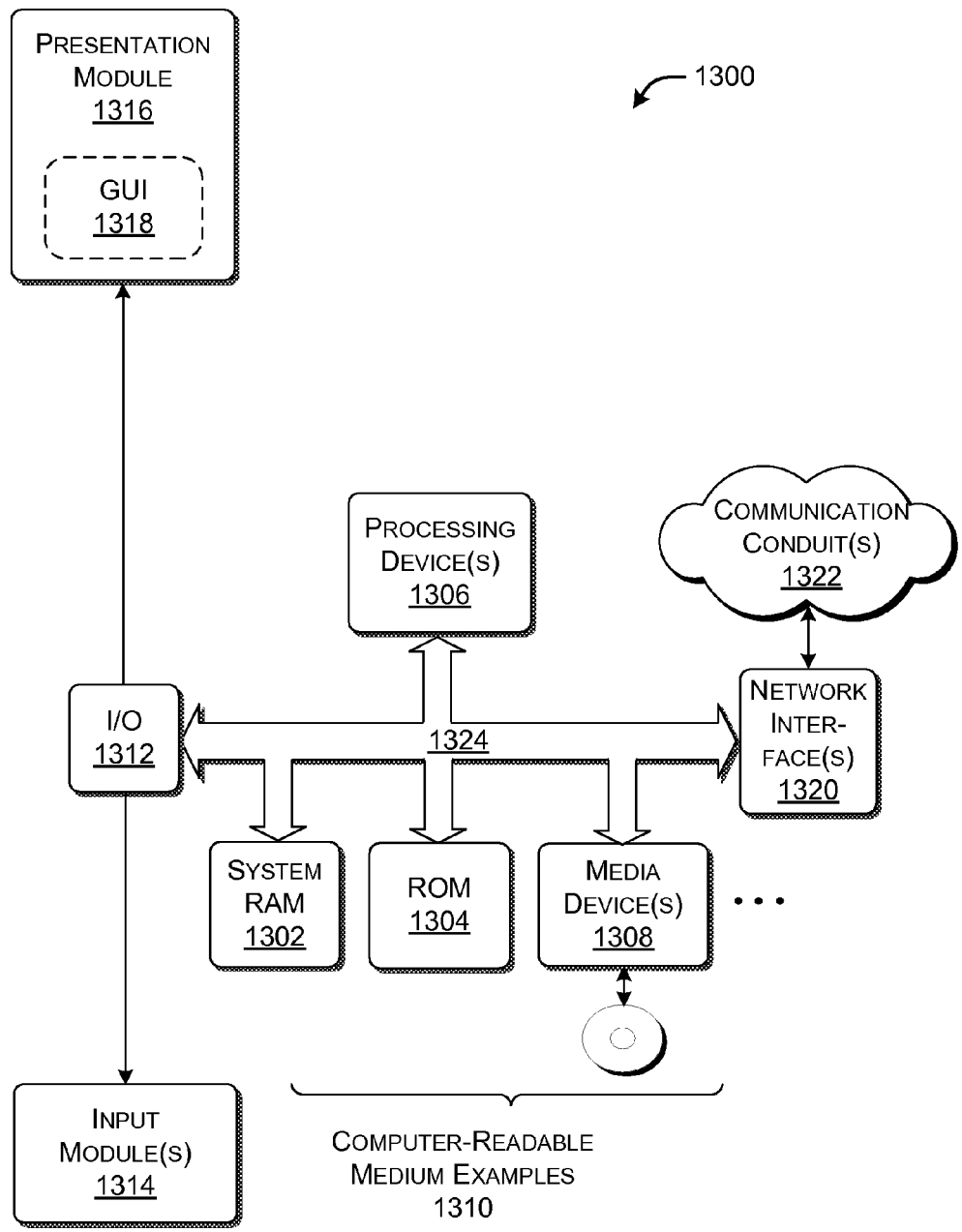
FIG. 13 shows illustrative processing functionality that can be used to implement any aspect of the features shown in the foregoing drawings.

As a preliminary matter, the various components shown in the figures can be implemented in any manner, for example, by software, hardware, firmware, manual processing operations, and so on, or any combination of these implementations. The phrase "configured to" refers to any way of providing a function, and may encompass any implementation or combination thereof (software, hardware, firmware, manual processing operations, and so on). FIG. 13, to be discussed in turn, provides additional details regarding one illustrative implementation of the functions shown in the figures.

Figure 1:
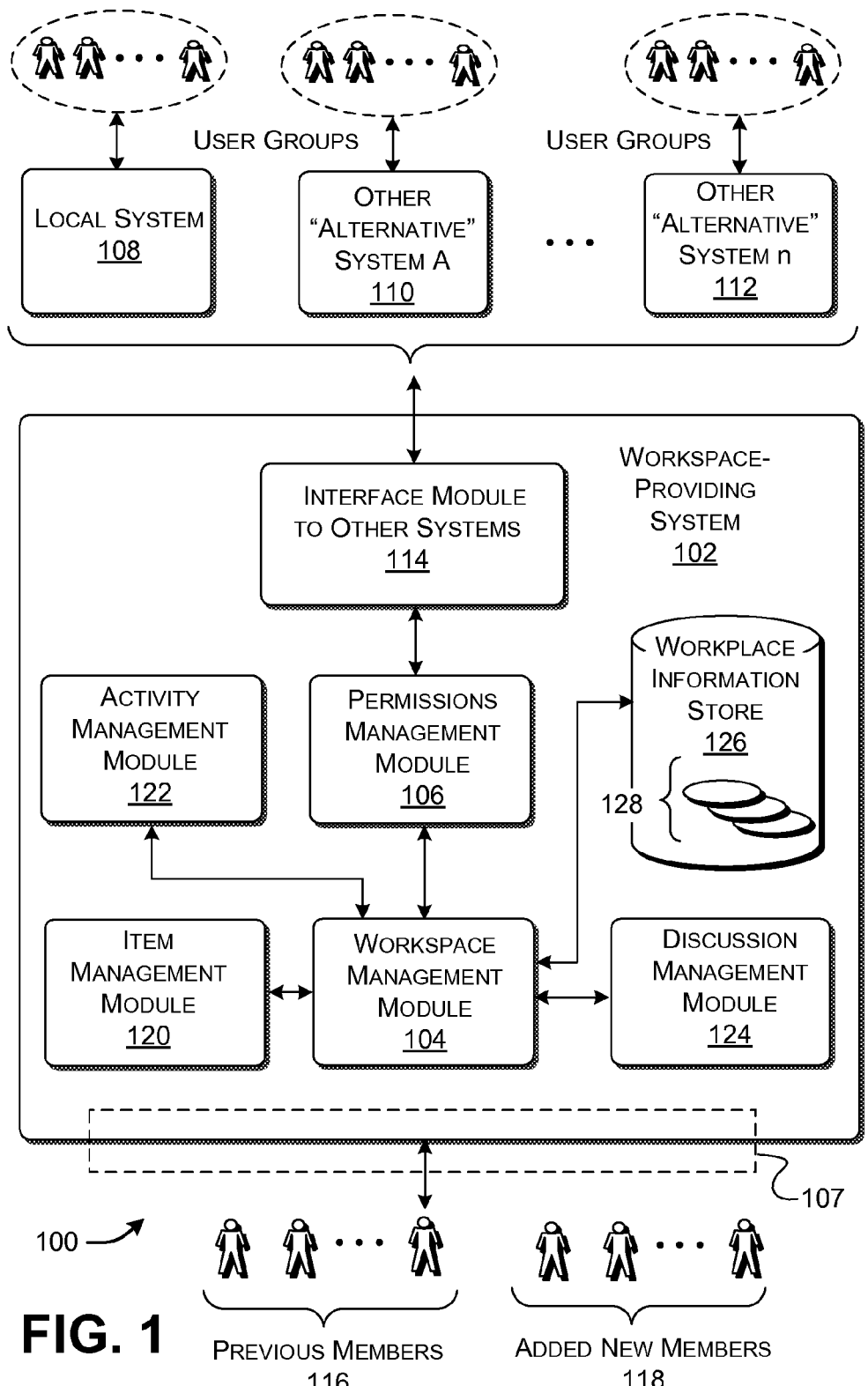
FIG. 1 shows an illustrative system that allows a user to manage permissions in a collaborative workspace (henceforth "workspace").

FIG. 1 shows a workspace-using environment 100. The workspace-using environment 100 includes a workspace-providing system 102. The workspace-providing system 102 provides a collaborative workspace (henceforth simply "workspace"). A workspace defines functionality which allows individuals to work on one or more shared tasks. The workspace includes permissions which define the individuals who are permitted to work on the workspace (referred to as "members" herein). The workspace also includes items (document items, data items, discussion items, etc.) that the members are permitted to work on in a collaborative fashion. In operation, authorized members may engage the workspace to work on the shared items in a coordinated fashion.

Figure 3:
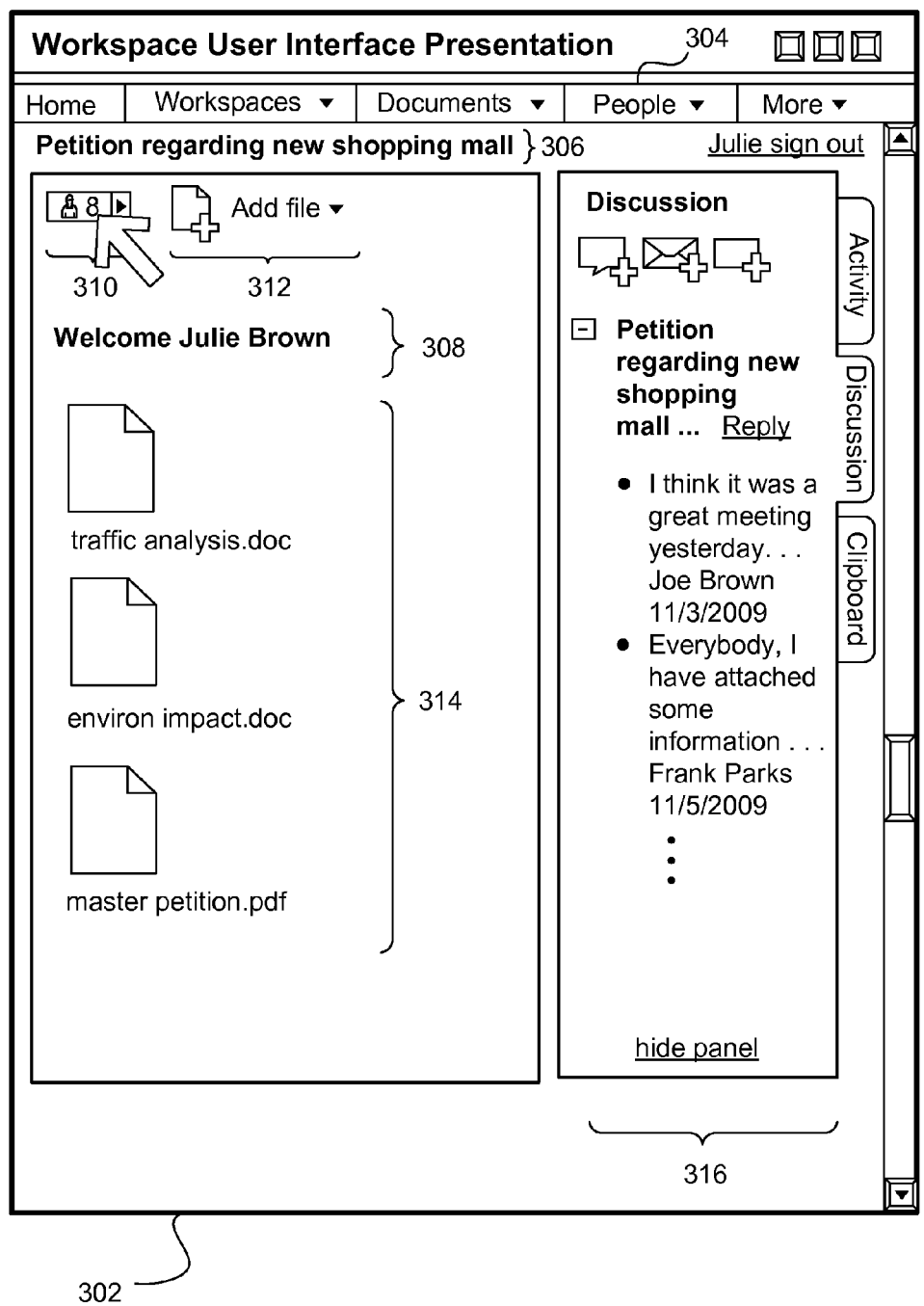
FIG. 3 shows an illustrative workspace user interface presentation through which the user may interact with a workspace.

The workspace-providing system 102 includes, or can be conceptualized to include, a collection of components. More specifically, FIG. 1 is a logical depiction of the workspace-providing system 102. In the logical depiction, the components perform different prescribed functions (to be described below). The logical functions may map to physical infrastructure in different ways. For example, the workspace-providing system 102 includes a workspace management module 104. The workspace management module 104 manages the general set-up and operation of a workspace. In doing so, the workspace management module 104 may be conceptualized as providing a main workspace user interface (UI) presentation (as shown in FIG. 3) through which members may interact with the workspace. In a physical implementation, however, these logical functions may be performed by a combination of backend functionality and frontend functionality. For instance, a physical implementation of the workspace-providing system 102 may include a frontend interface component 107 which performs the task of interfacing with members (and which thus implements all of the user interface presentations provided by the workspace-providing system 102, including the workspace UI presentation). Accordingly, reference to the workspace management module 104 should be understood as referring to whatever combination of functionality is used to perform its associated functions, however allocated among one or more components in a physical implementation. The same explanation applies to other logical components within the workspace-providing system 102.

The workspace management module 104 interacts with a permissions management module 106. The permissions management module 106 allows a user to grant individuals the right to access the workspace, thus assigning these individuals the status of members. The permissions management module 106 also allows the user to define the permission level of members. Illustrative permission levels include an owner permission level, and editor permission level, and a viewer permission level. A member who is assigned an owner permission level enjoys certain administrative rights with respect to the workspace, such as the ability to set up, manage, and terminate the workspace. (In general, the specific set of rights assigned to an owner-member may be environment-specific; for instance, different companies may decide to grant owner-members different respective sets of privileges.) A member who is assigned an editor permission level has the right to make changes to the workspace items. A member who is assigned a viewer permission level has the right to view the workspace items but does not have the right to makes changes to the workspace items.

The permissions management module 106 provides (or can be logically conceptualized to provide) a permissions UI interface. The permissions UI interface allows the user to specify the permission level of members and add new members to a workspace. As will be described with respect to FIG. 4, the permissions management module 106 displays the permissions UI interface without losing a context associated with the main workspace UI presentation. In other words, the permissions UI interface is displayed inline with respect to the main workspace UI presentation.

The permissions management module 106 allows the user to add new members from various systems. A system refers to a particular processing environment for performing prescribed tasks. For example, an Email system may correspond to functionality for sending and receiving Email messages. A social networking environment may correspond to functionality for allowing members of a social group to interact with each other via a network (such as the Internet), and so on. A system may be physically implemented using a collection of data processing equipment, such as various server-type computing devices, data stores, and so on.

FIG. 1 shows an illustrative three systems, system A 108, system B 110, and system n 112, although workspace-providing system 102 can interact with any number of systems. System A 108 is associated with the workspace-providing system 102, and is therefore referred to as a local system herein. That is, system A 108 is "local" to the workspace-providing system 102 because at least parts of the information that it provides are readily accessible to the workspace-providing system 102. The other systems (110, 112) may not be directly associated with the workspace-providing system 102, and are therefore referred to as alternative systems.

Each system may be associated with different groups of user. For example, assume that system B 110 is an Email system. A user who is operating the workspace-providing system 110 may have an Email account with system B 110. The user may also maintain a collection of Email contacts in system B. Accordingly, these contacts define a group of individuals associated with system B (from the vantage point of the user who is interacting with the workspace-providing system 102). Individuals who are associated with an alternative system (such as alternative system B 110) are referred to herein as "alternative persons." Individuals who are associated with the local system A 108 are referred to as local system persons.

The permissions management module 106 allows a user to add new members to the workspace who are either local system persons or alternative system persons. To perform this task, the workspace-providing system 102 relies on an interface module 114. The interface module 114 couples the permissions management module 106 to various systems (108, 110, . . . 112). Later figures will be used to explain illustrative ways in which the permissions UI presentation can be used to add local system persons and alternative system persons to a workspace.

FIG. 1 illustrates one outcome of the above-summarized procedure for adding persons to a workspace. The figure shows that a group of existing or previous members 116 are granted rights to interact with the workspace. The user interacts with the permissions management module 106 to add a group of new members 118 to the workspace. The new members 118 can be culled from any group of persons who are associated with the user, such as local system persons, alternative system persons, or some combination thereof.

The workspace management module 104 may also interact with an item management module 120. The item management module 120 allows a user to add and remove items from the workspace. Adding an item to a workspace has the effect of "placing" the item in a shared location where it can be accessed and acted upon by members of the workspace (in a manner defined by the respective permissions of the members). The items can include any type of information, including document items (word processing document items, spreadsheet document items, presentation-related document items, and so on), data items, discussion items, and so on. No limitation is placed on what may constitute an item as used herein.

The workspace management module 104 may also interact with an activity management module 122. The activity management module 122 manages tasks associated with the workspace. For example, the activity management module 122 can be used by the user to set up tasks for one or more workspace members. The activity management module 122 may also provide information regarding tasks that the user is asked to performed. The activity management module 122 can also provide various notifications to members. For example, the activity management module 122 can alert a member regarding who has used (or who has failed to use) the workspace within a specified period of time.

The workspace management module 104 may also interact with a discussion management module 124. The discussion management module 124 manages communication among workspace members. For instance, the discussion management module 124 can maintain a blog-type message thread which captures the message exchange among members. The discussion management module 124 can allow a member to reply to an existing message, start a new message thread, and so on.

The enumeration of logical modules in FIG. 1 is illustrative. Other implementations can include additional modules. In addition, or alternatively, an implementation can omit one or more of the modules shown in FIG. 1.

The result of setting up a workspace will be workspace information. The workspace information defines a linked collection of members, permissions, items, activities, notifications, and so on. A workspace information store 126 can be used to store workspace information 128 associated with different respective workspaces (represented in the figure as ovals). In one case, the workspace store 126 can store an actual copy of the items that are included in a workspace. Alternatively, or in addition, the workspace store 126 can store reference pointers which point to various workplace items that are stored elsewhere. A workspace itself is a logical concept. That is, a workspace corresponds to a logical "space" that is defined by workspace information in conjunction with the functionality used to interact with the workspace information.

Figure 2:
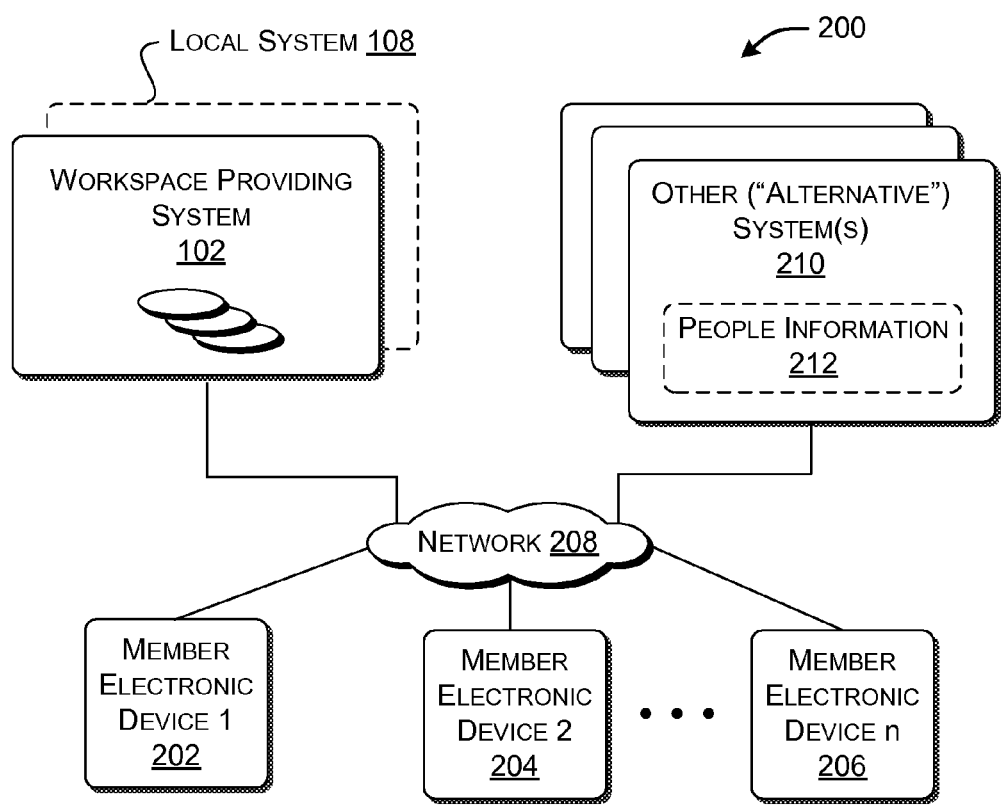
FIG. 2 shows an illustrative network-related implementation of the system of FIG. 1.

Advancing to FIG. 2, this figure shows one illustrative system 200 that can be used to implement the workspace-providing system 102. The system 200 implements the workspace-providing system 102 in a network environment. In the network environment, members may access the workspace-providing system 102 using respective member electronic devices (202, 204, . . . 206) via a network 208.

The member electronic devices (202, 204, . . . 206) can correspond to any type of data processing device or any combination of types of data processing devices. For instance, a member electronic device can be implemented by a desktop computer, a laptop computer, a personal data assistant (PDA) device, a mobile communication device, a set-top box, a game console device, and so on. Or the electronic member device can correspond to special-purpose equipment expressly designed for interacting with the workspace-providing system 102. Members may access network-accessible resources using browsing functionality (not shown) provided by the member electronic devices (202, 204, . . . 206).

The network 208 may represent any type of mechanism for allowing the member electronic devices (202, 204, . . . 206) to interact with the workspace-providing system 102. The network 208 can correspond to a wide area network (such as the Internet), a local area network (LAN), a point-to-point connection, or any combination of connectivity mechanisms. The network 208 can be physically implemented using any combination of hardwired links, wireless links, name servers, gateways, routers, and so on (not shown). The network 208 can be governed by any protocol or combination of protocols.

In one scenario, the functionality and information associated with a workspace are entirely provided by the workspace-providing system 102 at some network-accessible location (or locations). This means, for instance, that all of the items associated with a workspace may be stored at some network-accessible location (or locations). Alternatively, or in addition, parts of the workspace functionality and/or workspace information can be implemented locally by the member electronic devices (202, 204, . . . 206). For instance, a workspace may include one or more items that are stored locally on one or more member electronic devices (202, 204, . . . 206). The workspace information stored at the workspace-providing system 102 may include reference pointers which point to these items; that is, optionally, the workspace information may not store the items themselves. In another alternative case, part (or all) of the workspace-providing system 102 can be implemented using peer-to-peer (P2P) infrastructure, thus eliminating or reducing the role of a centrally-provided workspace-providing system 102. Still other implementations are possible.

As mentioned above in connection with FIG. 1, the permissions management module 106 may interact with various systems, such as a local system 108 and various alternative systems (110, . . . 112). FIG. 2 illustrates one implementation of these systems (108, 110, . . . 112). The workspace-providing system 102 is shown as being grouped with the local system 108 to graphically illustrate the affiliation between these two systems. The workspace-providing system 102 is shown as being separate from the various alternative systems (110, . . . 112) to emphasize that the workspace-providing system 102 may not be affiliated with the alternative systems (110, . . . 112). For example, one illustrative alternative system may comprise an Email system. Another illustrative alternative system may comprise a social networking system, and so on. If these alternative systems (110, . . . 112) are implemented in a network environment (as shown), they can be separately accessed at respective network addresses.

As described above, different systems may be associated with different groups of people. For instance, a local system is associated with a group of local system persons, while an alternative system is associated with a group of alternative system persons. FIG. 2 illustrates this feature by showing that one of the alternative systems includes people information 212 that identifies one or more groups of people.

FIG. 3 shows a workspace UI presentation 302 that can be provided by the workspace management module 104 (although, as stated above, the workspace-providing system 102 may physically provide the workspace UI presentation 302 using a combination of backend functionality and frontend interface component 107). The workspace UI presentation 302 serves as a main interface through which authorized members may interact with the workspace. In the discussion below, the person who interacts with the workspace UI presentation 302 is referred to as a user.

The workspace UI presentation 302 includes various component parts. The selection and arrangement of these parts shown in FIG. 3 is representative; other implementations can adopt different selections and arrangements of parts than that shown in the UI-related figures.

A menu part 304 of the workspace UI presentation 302 allows the user to invoke different functions provided by the workspace UI presentation 302. For instance, a "workspace" option allows the user to select a particular workspace with which to interact. A "documents" option allows the user to view items that can be added to the workspace, and then to select and add such items. A "people" option allows the user to view people who may be added to the workspace, and then to select and add such persons. The menu part 304 can include yet additional options.

In the representative case of FIG. 3, the user has selected a workspace related to a neighborhood petition regarding a new shopping mall. A title part 306 of the workspace UI presentation 302 identifies a title associated with the workspace, namely "Petition regarding new shopping mall." A message part 308 of the workspace UI presentation 302 provides a message to the user. In this case, the message is an introductory message which reads "Welcome Julie Brown." In this representative example, the user, Julie Brown, is an owner of the workspace, which allows her to perform various administrative functions with respect to the workspace.

A member indicator part 310 of the workspace UI presentation 302 identifies how many members are currently assigned to this workspace. In this example, there are eight members. The user can activate the member indicator part 310, upon which the member indicator part 310 will reveal information that identifies the eight members. An "add file" part 312 of the workspace UI presentation 302 allows a user, upon activation, to add items to the workspace.

An item presentation part 314 of the workspace defines a space for displaying some of the items associated with the workspace. The item presentation part 314 may represent each item using a graphical icon in combination with the item's file name. This is merely an example. Alternatively, or in addition, for instance, the item presentation part 314 can identify each item by only listing the file name of the item. The user can activate an item by clicking on the item (or activating it in some other way). Once activated, the user can view the item and edit the item (if the user has editing rights). In the example of FIG. 3, all of the items correspond to document items that pertain to the workspace theme, that is, a neighborhood petition.

A side panel part 316 provides different functions associated with different tabs. FIG. 3 shows three representative tabs in the side panel part 316: an activity tab; a discussion tab; and a clipboard tab. The tabs activate panels for performing associated functions and displaying associated information. Other implementations may include additional tabs, fewer tabs, and/or different types of tabs. The user can remove and restore the side panel part 316 by activating an appropriate command, such as a "hide panel" command and a "restore panel" command, respectively.

The activity tab activates an activity panel (not shown in FIG. 3). The activity management module 122 can implement the activity panel. The activity panel provides information regarding various tasks that are assigned to the user in connection with the workspace. The activity panel also provides functionality that allows the user to assign new tasks and schedule events. The activity panel may also provide information regarding various notifications generated by the activity management module 122.

The discussion tab activates a discussion panel (which corresponds to the panel that is activated in FIG. 3). The discussion management module 124 can implement the discussion panel. The discussion panel provides discussion items (less formally, "messages") pertaining to the workspace. In this case, the discussion items form a thread of messages exchanged among members of the workspace. In one case, the discussion panel can organize the discussion items in a blog-type format, that is, with indentations illustrating the sequence of discussion items in the exchange. The discussion panel may include one or more prompts which enable the user to contribute to the discussion thread, e.g., by replying to an existing discussion item, starting a new discussion thread, and so on. The discussion items in the discussion thread constitute particular types of workspace items, as broadly defined herein.

The clipboard tab activates a clipboard panel (not shown in FIG. 3). The clipboard panel identifies items that have been stored in the user's clipboard. The user may add any of the items in the clipboard to the workspace, e.g., by moving the items from the clipboard panel to the item presentation part 314 using a drag-and-drop operation or other technique.

Figure 4:
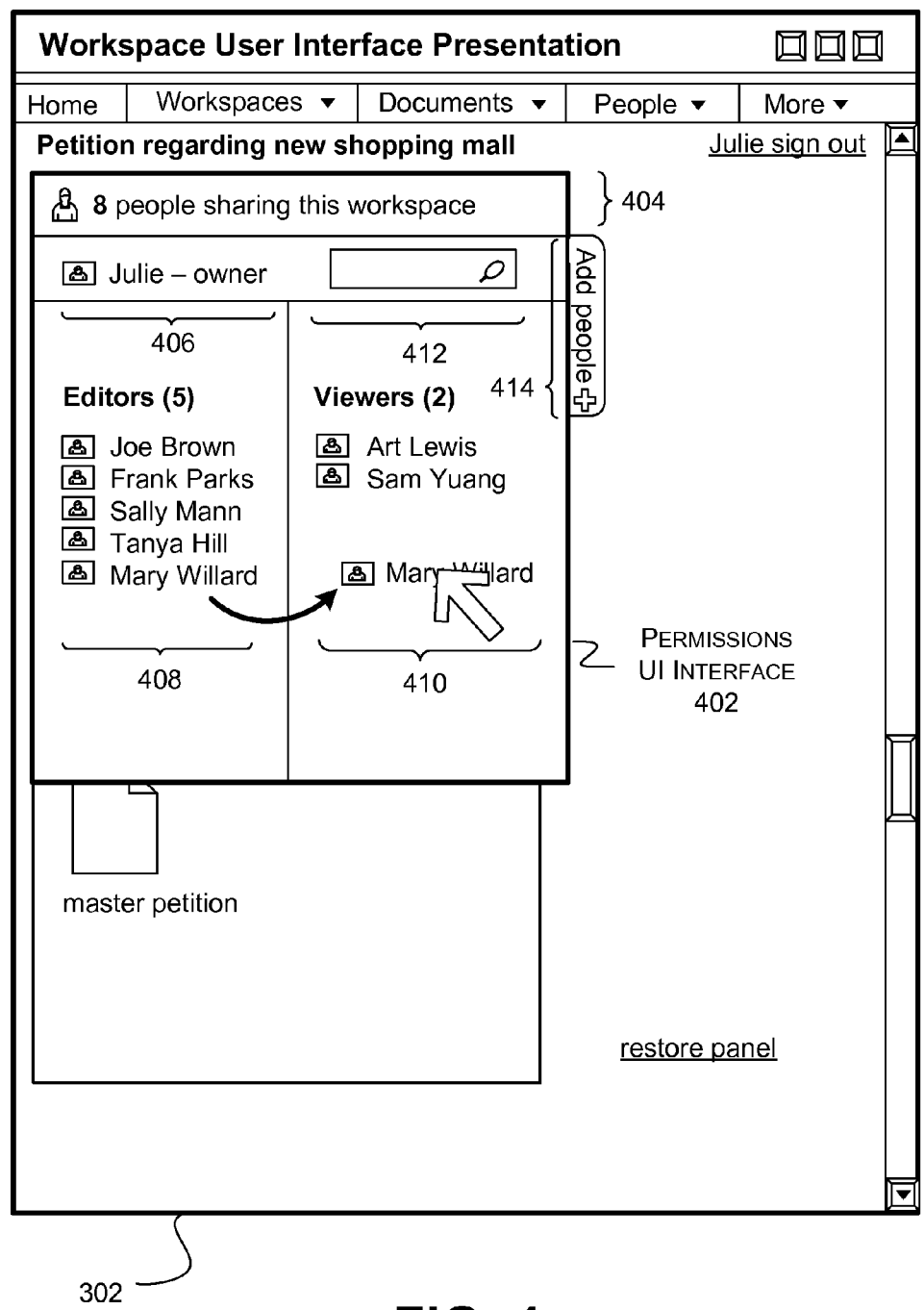
FIG. 4 shows an illustrative permissions user interface presentation that allows a user to manage permissions of a workspace.

FIG. 4 shows another depiction of the workspace UI presentation 302 (with the side panel part 316 hidden to facilitate illustration). In this case, the user has activated a permissions UI presentation 402. In one scenario, the user invokes the permissions UI presentation 402 by clicking on the member indicator part 310 (illustrated in FIG. 3). This causes the permissions management module 106 to display the permissions UI presentation 402 inline with respect to the workspace UI presentation 302. In other words, the permissions management module 106 displays the permissions UI presentation 402 without losing the context associated with the main workspace UI presentation 302.

The permissions UI presentation 402 includes plural component parts. A title part 404 of the permissions UI presentation 402 conveys how many people are members of the workspace in question—in this case, there are currently eight such people.

An owner-identification part 406 provides information that identifies the owner or owners associated with the workspace. In this case, there is only one owner, Julie Brown, who happens to also be the user who is currently interacting with the workspace UI presentation 302. An editor-identification part 408 provides information that identifies editors associated with the workspace. In this case, there are five named members with editing privileges. A viewer-identification part 410 provides information that identifies viewers associated with the workspace. In this case, there are two named viewers. Together, these parts (406, 408, and 410) visually organize the members of the workspace into different groups associated with different respective permission levels. As shown, one or more of the parts (406, 408, 410) can organize the members in columns; in addition, or alternatively, other graphical approaches can be used to organize the members.

The user can change the permission level of an existing member in various ways. In one technique, the permissions UI presentation 402 can permit the user to drag a member name from one part to another part. For example, assume that the user wants to change the permission level of "Mary Willard" from her current status as an editor to a target status of viewer. The user may single-click on the name "Mary Willard" in the editor-identification part 408 and drag this name to the viewer-identification part 410. The user can alternatively double click on Mary Willard's name in the editor-identification part 408, prompting the permissions UI presentation 402 to display additional information (not shown) regarding Mary Willard, including her permission level. The user can modify this person's permission level by directly making changes to the displayed additional information. Still other techniques can be used change the permission level of exiting members.

A search part 412 allows the user to search for a member, e.g., by inputting the name of the member being sought as a search term. The permissions management module 106 responds to the search by displaying information regarding the member. The user may choose to perform this search in those circumstances in which a workspace has a relatively large number of members, so that it may be difficult to identify (at quick glance) the member being sought within the full list provided by the permissions UI presentation 402.

An add people tab 414 can be activated by the user to invoke a process for adding one or more people to the workspace, thus making these people new members of the workspace. Assume that the user activates this tab 414. The permission management module 106 responds by representing an added person panel 502, as shown in FIG. 5.

Figure 5:
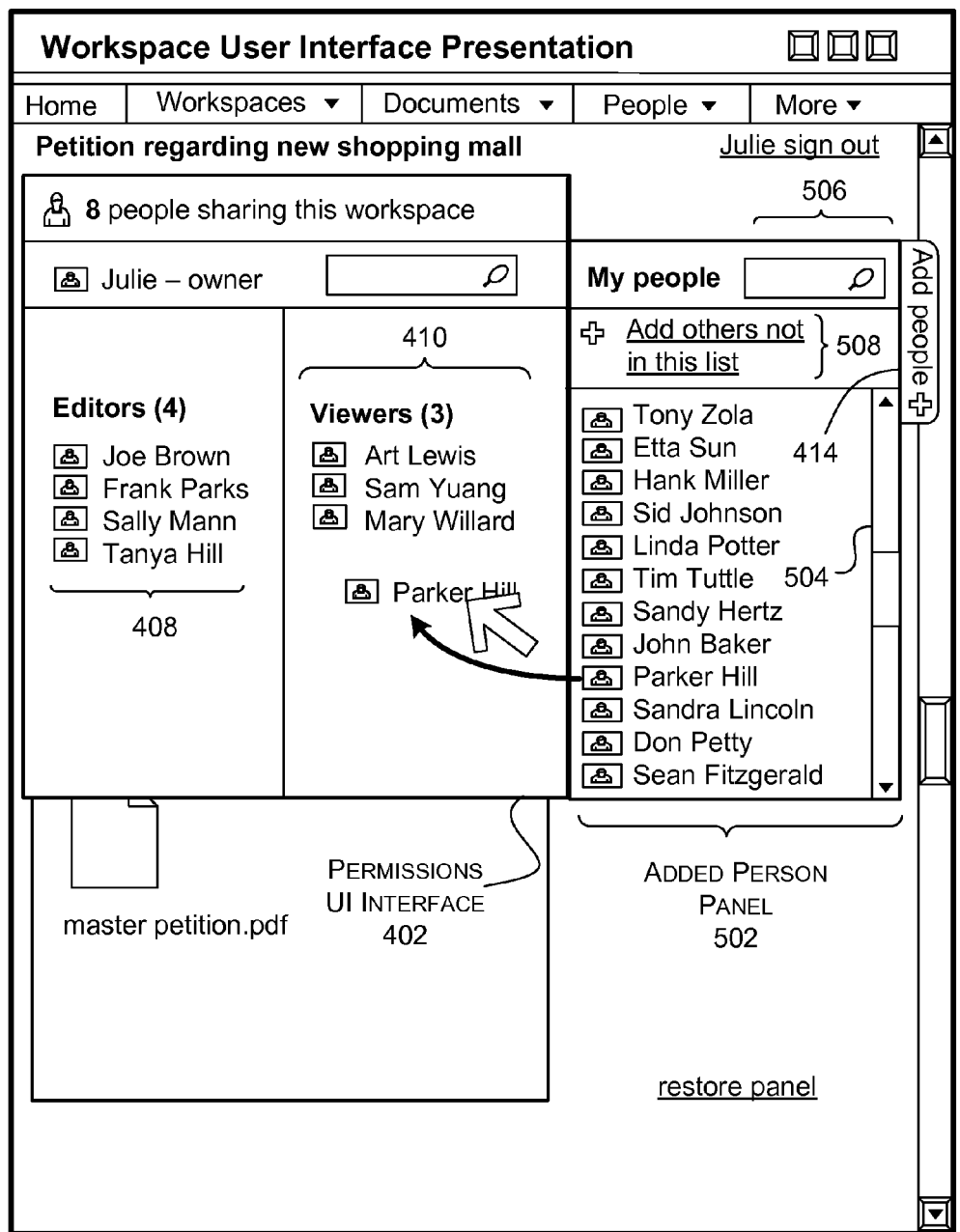
FIG. 5 shows an illustrative expanded version of the permissions user interface presentation of FIG. 4, showing a list of local system persons, any of which can be selected and added to the workspace.

More specifically, FIG. 5 shows another depiction of the workspace UI presentation 302 and the permissions UI presentation 402. As stated, the user has activated the "add people" tab 414. This action prompts the presentation of an added person panel 502. In one illustrative implementation, the added person panel 502 displays a group of persons who are associated with the user (Julie Brown) in the context of the local system A 108. Hence, according to the terminology used herein, these people are referred to as local system persons. In other words, the local system persons are individuals who already have an affiliation with the workspace-providing system 102.

Note that the expanded permissions UI presentation 402 is still displayed inline with respect to the workspace UI presentation 302. In other words, the permissions UI presentation 402, including the added person panel 502, is still displayed without loosing context with the main workspace UI presentation 302.

The added person panel 502 may include a scroll bar 504 or like mechanism for scanning the list of local system persons. The added person panel 502 also includes a search part 506. The search part 506 allows the user to search for a desired local system person, e.g., by inputting the name of the desired person as a search term. The permissions management module 106 responds to the search by displaying information regarding the desired person, if there is record of such a person.

Upon locating a desired person, the user can grant that person membership status in the workspace. The permissions UI presentation 402 can accommodate different techniques for performing this function. In one technique, the user can move a desired person from the added person panel 502 to a target permission identification part of the permissions UI presentation 402. For example, assume that the user wishes to grant viewer status to the person "Parker Hill," who currently is listed as a local system person, but who currently is not a member of the workspace. As shown in FIG. 4, the user can single-click on Parker Hill's name in the added person panel 502 and drag the name into the viewer-identification part 410. This action causes the permission management module 106 to add Parker Hill as a member of the workspace, having a permission level of "viewer." The permissions UI presentation 402 can also include functionality that allows the user to select multiple names in the added person panel 502 and move the corresponding names as a group to a desired permission identification part of the permissions UI presentation 402.

Alternatively, the person that the user wants to add to the workspace may not currently exist among the user's local system persons. To address this scenario, the user can activate an "add others" command 508. This invokes a process for adding non-local ("alternative") system persons to the workspace, as set forth below with respect to FIGS. 6-9.

Figure 6:
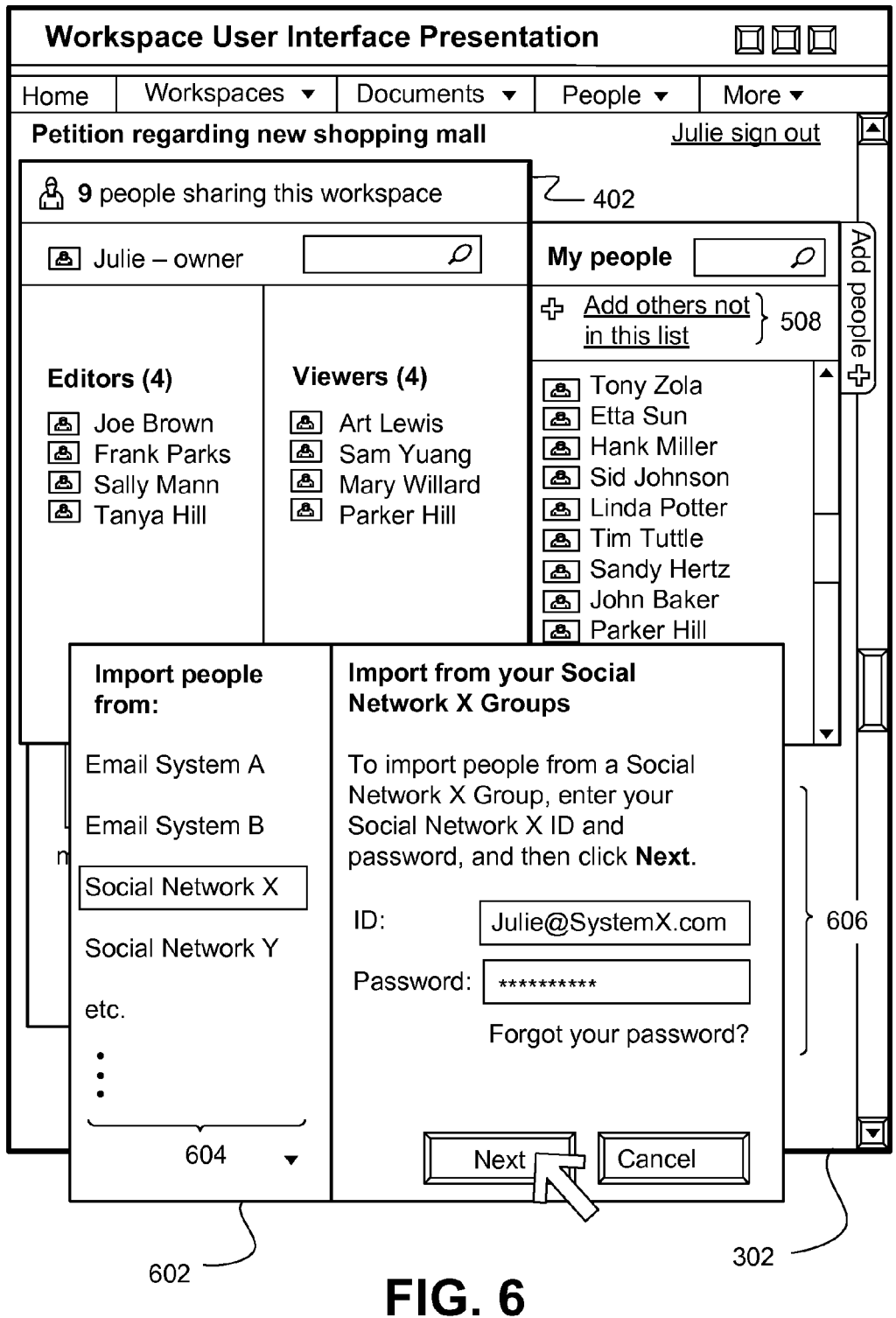
FIG. 6 shows an illustrative introductory user interface presentation, invoked upon the user's actuation of an import command, which invites the user to select an alternative system and then enter credential information to gain access to the alternative system.

Starting with FIG. 6, this figure shows the presentation of an introductory UI presentation 602 that may be invoked when the user activates the "add others" command 508 in the added person panel 502. The introductory UI presentation 602 is displayed without losing the context associated with either the workspace UI presentation 302 or the permissions UI presentation 402.

The introductory UI presentation 602 includes a system selection part 604. The system selection part 604 provides functionality that allows the user to select an alternative system, e.g., in this merely illustrative case, the user may select from among Email System A, Email System B, Social Network X, Social Network Y, and so on. Each system may maintain information regarding a population of persons associated with the system. For example, assume that the user has previously defined a group of colleagues using a social networking system, such as Social Network X. Assume further that the user desires to grant one of these colleagues membership status in the neighborhood petition workspace. If so, the user can activate the entry for "Social Network X" in the system selection part 604. FIG. 6 illustrates the Social Network X entry with a box around it to graphically represent the fact that is has been selected by the user.

The introductory UI presentation 602 also includes a user validation part 606. The user validation part 606 can invite the user to enter credential information (e.g., user ID and user password, etc.) to gain admittance to the selected alternative system—in this case, Social Network X.

Figure 7:
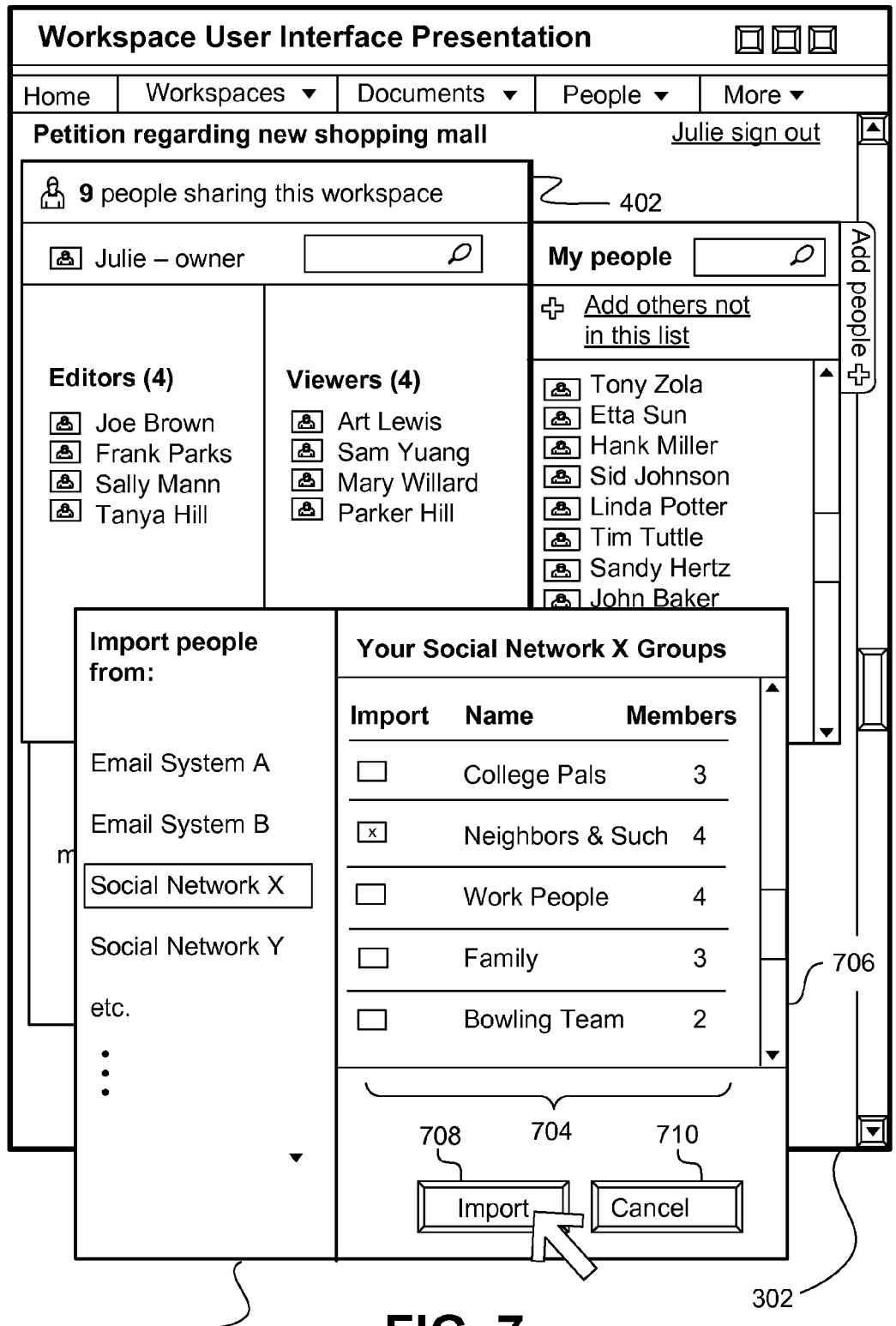
FIG. 7 shows an illustrative user interface presentation that invites the user to select one or more alternative system persons associated with the alternative system selected in FIG. 6.

Advancing to FIG. 7, assume that the user has entered valid credentials to gain access to the alternative system associated with Social Network X. The permissions management module 106 responds by presenting an alternative person UI presentation 702. The alternative person UI presentation 702 is displayed without losing the context associated with either the workspace UI presentation 302 or the permissions UI presentation 402.

The alternative person UI presentation 702 includes an alternative person part 704. The alternative person part 704 identifies alternative system persons associated with Social Network X. In the illustrated case shown in FIG. 7, the alternative person part 704 identifies groups of people previously defined by the user within Social Network X, such as "College Pals," "Neighbors & Such," and so on. Alternatively, or in addition, the alternative person part 704 can identify individual alternative system persons, that is, by listing these people by individual name. The alternative person part 704 includes a scroll bar 706 for navigating within the list of alternative system persons.

Assume in this merely illustrative case that the user wishes to add the entire group "Neighbors & Such" to the workspace as new members. In this case, the user can click on a box adjacent to this group and activate an import command 708. Or the user can abort the operation by activating a cancel command 710.

Assume that the user has activated the import command 708. This causes the permission management module 106 to import all of the alternative system persons in the group "Neighbors & Such" into the user's collection of local system persons, such that everyone in the group "Neighbors & Such" is now identified as a local system person.

Figure 8:
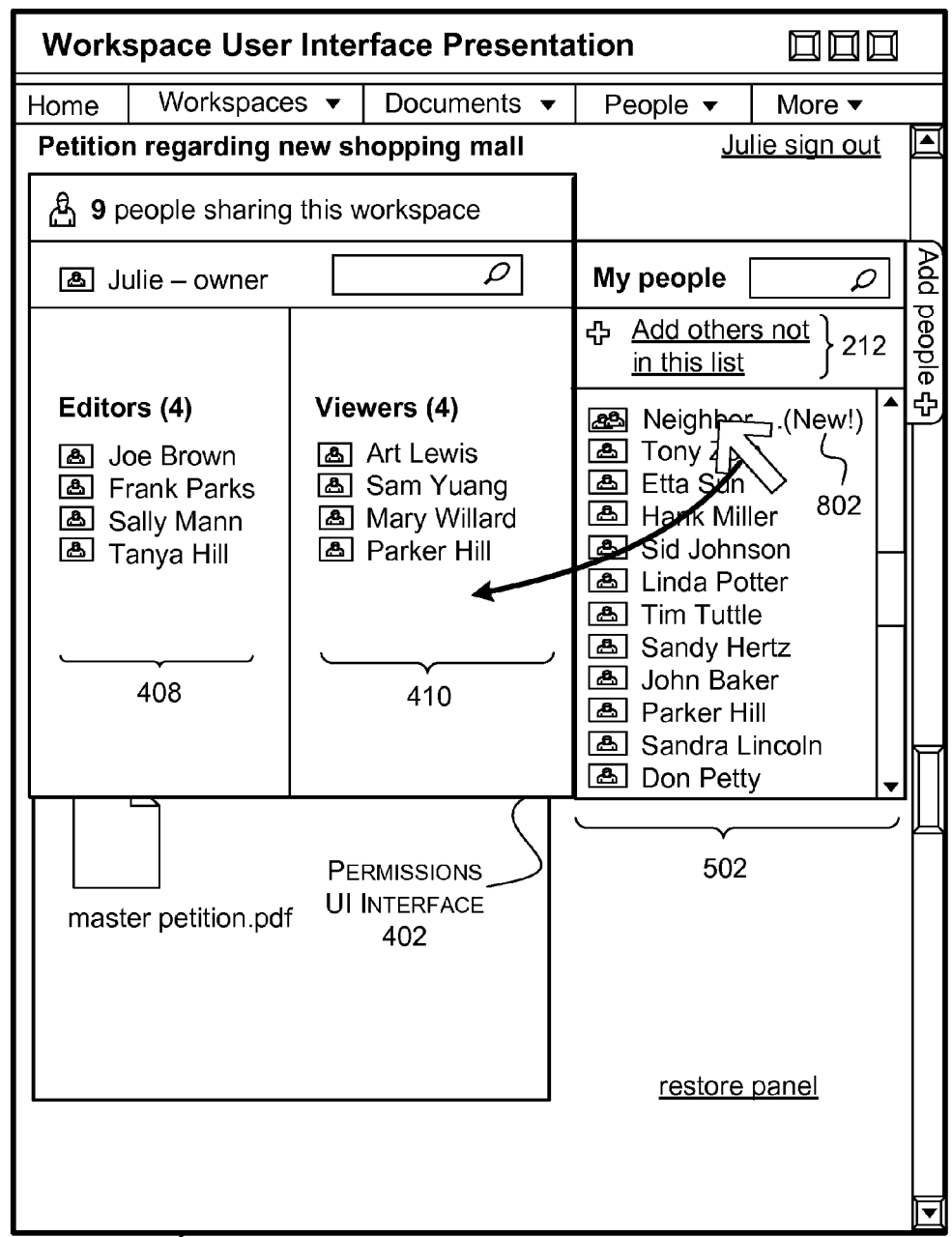
FIG. 8 shows the illustrative permissions user interface presentation of FIG. 5, here indicating how a group of alternative system persons, which have been redefined as a group of local system persons (by importing this group into the local system), can be added as new members of the workspace.

FIG. 8 shows the outcome of the actions taken by the user in FIG. 7. Namely, FIG. 8 again shows the permissions UI presentation 402 which is displayed inline with respect to the main workspace UI presentation 302. In this case, the added person panel 502 has been updated to indicate that the group "Neighbors & Such" has been added to the list of the user's local system persons. The added person panel 502 may display an indicator 802 (e.g., "New!," etc.) which indicates that the group "Neighbors & Such" has just been added to the list of local system persons.

At this juncture, the user can proceed in the manner set forth above with respect to FIG. 5. Namely, the user can add the individuals in the group "Neighbors & Such" to the current set of workspace members by dragging the group name "Neighbors & Such" to an appropriate permission identification part (e.g., parts 406, 408, or 410). In illustrated case shown in FIG. 8, the user is in the process of clicking on and dragging the group "Neighbors & Such" to the viewer-identification part 410 of the permissions UI presentation 402. In response to this action, the permissions management module 106 will automatically grant all of the individuals in the designated group the right to view the workspace items (but not edit them). Alternatively, the user may expand the members in the group "Neighbors & Such" within the added person panel 502 and move one or more individual members in that group to the desired permission identification part of the permissions UI presentation 402.

Figure 9:
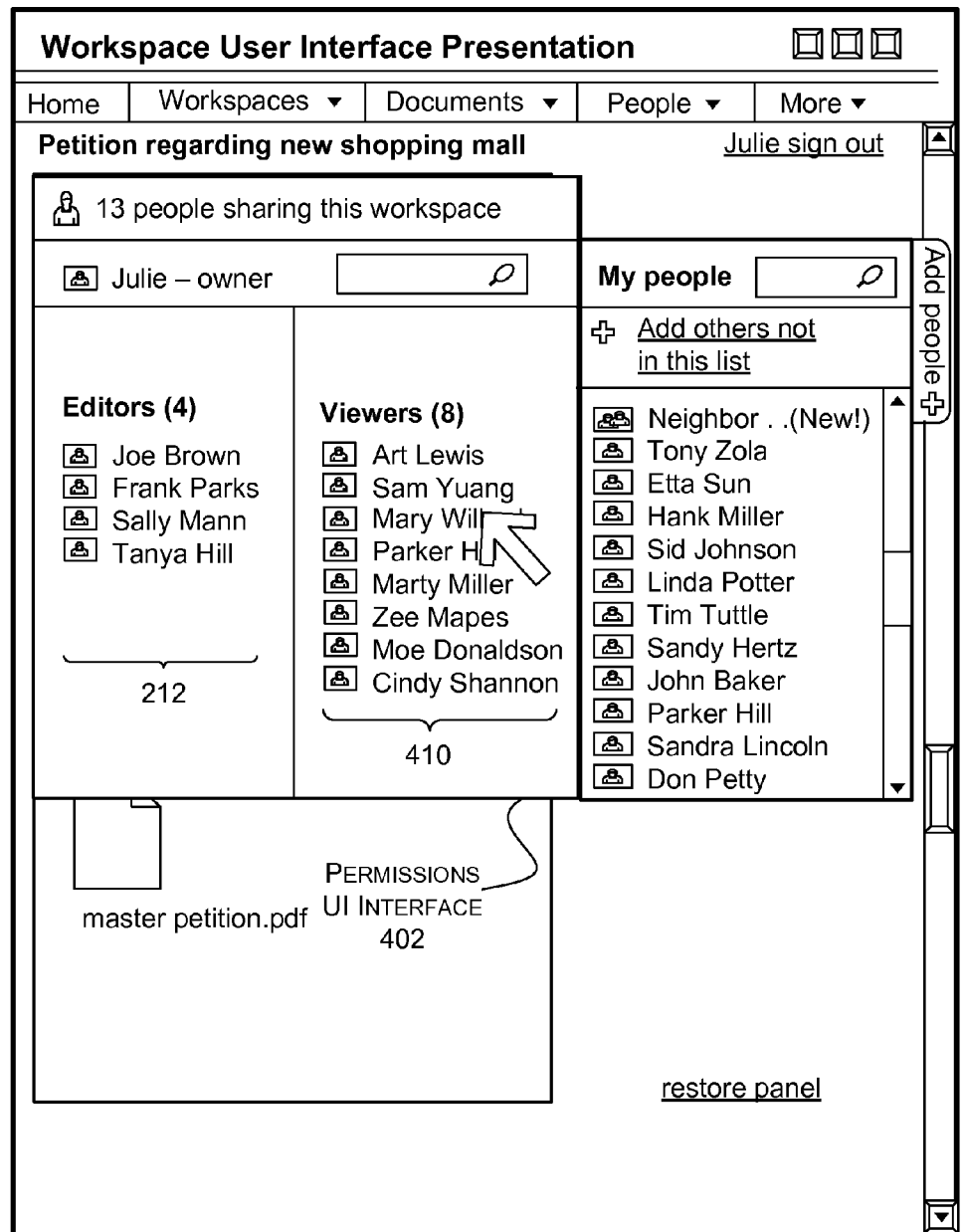
FIG. 9 shows the illustrative permissions user interface presentation of FIG. 5, here indicating the result of the action illustrated in FIG. 8.

FIG. 9 shows the result of the actions described above with respect to FIG. 8. In this case, the viewer-identification part 410 has been updated to include all four individuals in the group "Neighbors & Such." Once again, note that the permissions UI presentation 402 remains inline with respect to the workspace UI presentation 302.

The above process for adding alternative system persons is illustrative and non-limiting, and can be varied in many ways. For example, in an alternative approach, the permissions management module 106 can permit the user to directly "move" alternative system persons from the alternative person part 704 (of FIG. 7) to the desired permission-identification part (406, 408, or 410), that is, without using the added person panel 502 as a middleman in the operation.

Figure 10:
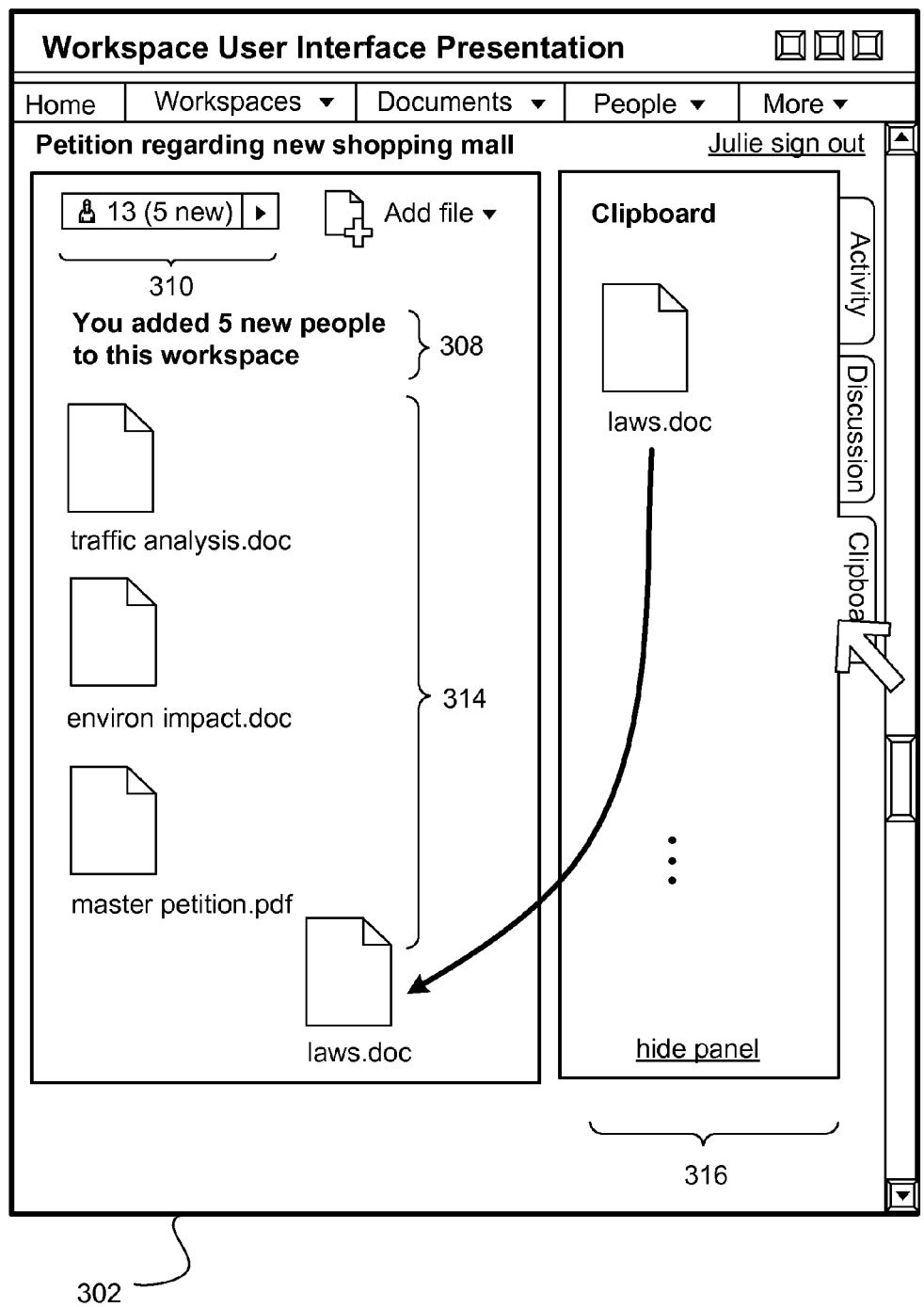
FIG. 10 shows the workspace user interface presentation of FIG. 3, indicating how an item can be moved from a clipboard panel to an item identification part of the workspace user interface presentation, allowing workspace members to access the item.

FIG. 10 shows another depiction of the workspace UI presentation 302, introduced in FIG. 3. Various features in the workspace UI presentation 302 reflect the outcome of the adding process described above. For instance, the message part 308 now alerts the user (Julie Brown) that five new people have been added to the workspace (namely, Parker Hill from the local system person list and the four-person group "Neighbors & Such" from a user group maintained by Social Network X). Similarly, the member indicator part 310 reveals that the workspace now includes thirteen members, five of which are new.

Finally, note that the user has also activated the clipboard tab of the side panel part 316. This action causes the workspace UI presentation 302 to display the clipboard panel. The user's clipboard panel contains one document item. The user may move this document item into the item identification part 314 in any manner, such as by clicking on and dragging the document item to the item identification part 314. This operation has the effect of adding the identified document item to the set of workspace items, enabling members to view and edit (if permitted) this document item in a shared fashion.

In general, the process of managing permissions occurs in a user-friendly manner in the same context as other workflow UI presentations. This aspect of the workplace providing system 102 may help integrate the user's permission management experience with the overall flow of workspace activities, potentially making the user's permission management experience less complex and difficult. This aspect, in turn, may encourage the user to define permissions in a relatively fine-grained manner to render the workspace more secure.

B. Illustrative Flowcharts

Figure 11:
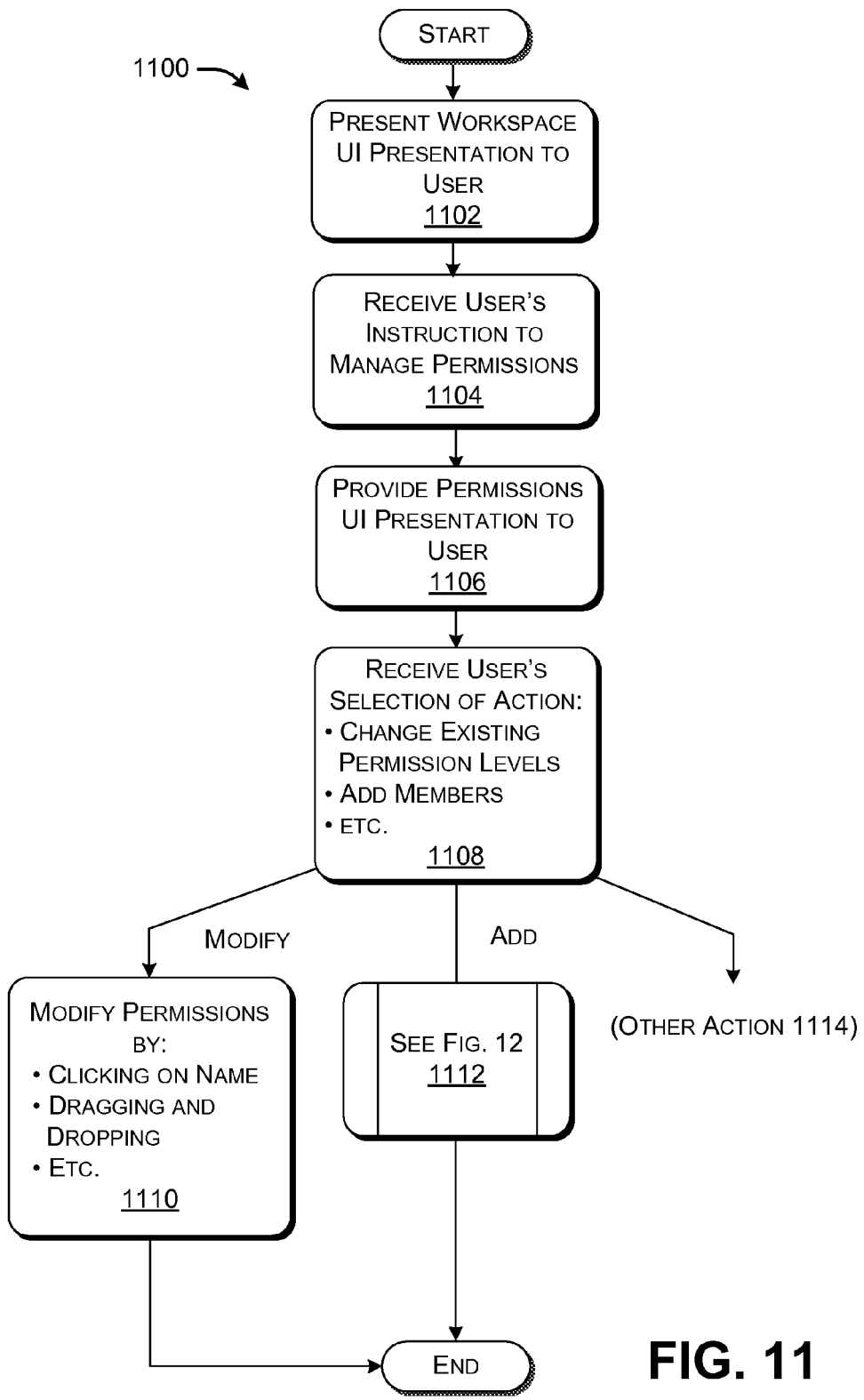
FIG. 11 is a flowchart which shows an illustrative overview procedure for managing permissions for a workspace.
Figure 12:
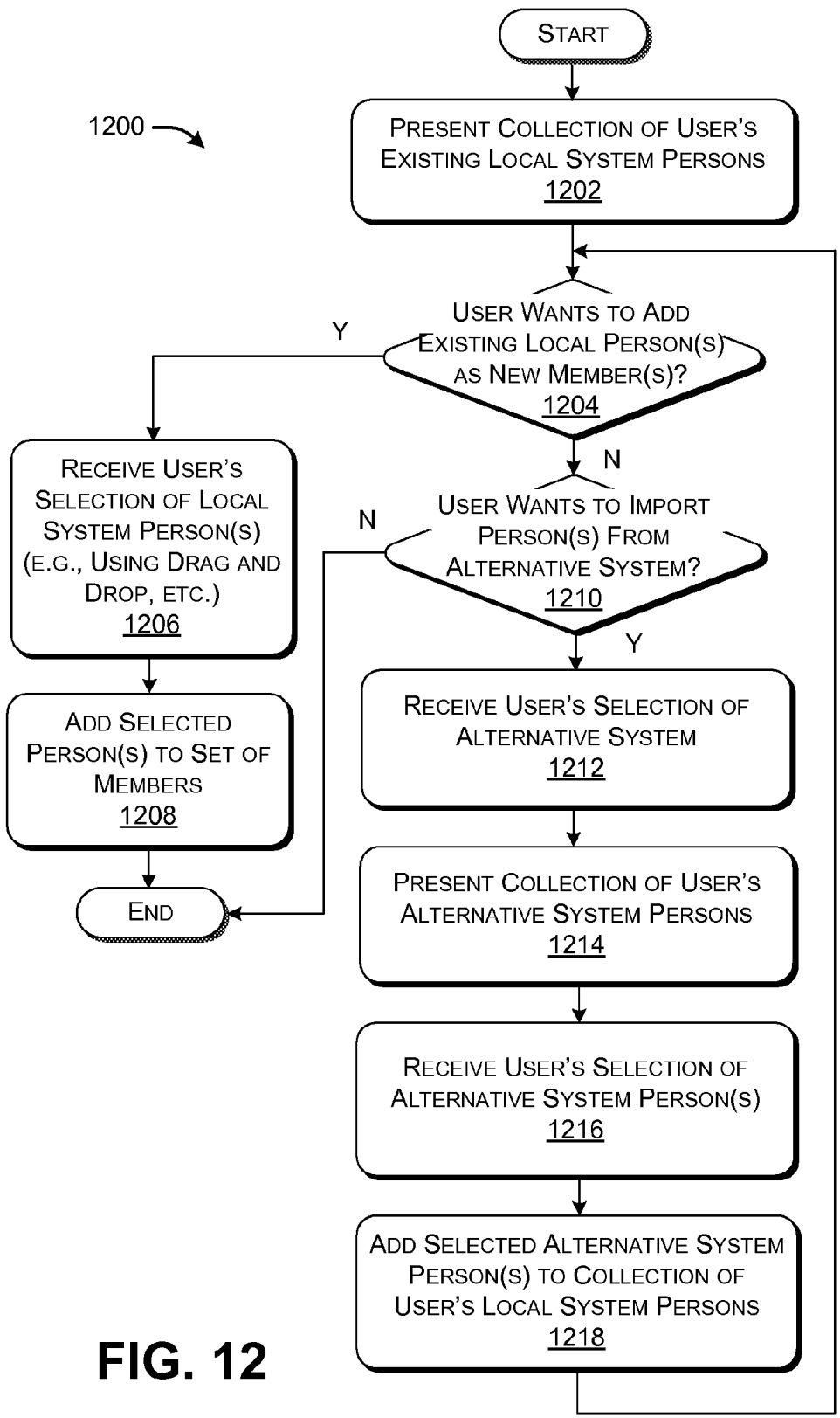
FIG. 12 is a flowchart which shows an illustrative procedure for adding new members to the workspace.

FIGS. 11 and 12 illustrate the operation of the system 100 in flowchart form. To facilitate discussion, certain operations are described in FIGS. 11 and 12 as constituting distinct blocks performed in a certain order. Such implementations are illustrative and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

As the functions described in the flowcharts have already been set forth above, the following explanation will serve as a summary and review of those functions.

Starting with FIG. 11, this figure shows a procedure 1100 for interacting with the permissions UI presentation 402 in an inline manner with respect to the workspace UI presentation 302. The procedure 1100 is described from the general vantage point of being executed by the workspace-providing system 102.

In block 1102, the workspace-providing system 102 provides the workflow UI presentation 302 upon the request of the user.

In block 1104, the workspace-providing system 102 receives the user's request to manage permissions. In one merely illustrative case, the workspace-providing system 102 can receive such an instruction in response to the user's activation of the member indicator part 310 shown in FIG. 3.

In block 1106, the workspace-providing system 102 presents the permissions UI presentation 402 to the user. The workspace-providing system 102 presents the UI presentation 402 inline with respect to the workspace UI presentation 302, e.g., without losing the context of the workspace UI presentation 302.

In block 1108, the workspace-providing system 102 receives an instruction associated with some action that the user wishes to take. For instance, the user may have entered an instruction to change the permission level of an existing member. Or the user may have entered an instruction to add a new member, and so forth.

In block 1110, assume that the user has entered an instruction to change the permission level of an existing member. In this case, block 1110 carries out this instruction. In one case, the user can change the permission level using a drag-and-drop procedure. In another case, the user can change the permission level by clicking on a name to invoke additional information regarding a member; the user can then make permissions-related changes directly to the additional information.

In block 1112, assume that the user has entered an instruction to add one or more persons to the workspace. In this case, block 1112 indicates that the procedure 1200 shown in FIG. 12 is invoked.

Block 1114 generally indicates the receipt (and action upon) some other instruction made by the user.

FIG. 12 shows a procedure 1200 for adding a member (or members) to a workspace.

In block 1202, the workspace-providing system 102 presents a list of people associated with the user in the context of the local system. According to the terminology used herein, the people are local system persons. In one implementation, the permissions UI presentation 402 can present a list of local system persons in the added person panel 502.

In block 1204, the workspace-providing system 102 determines whether the user wants to add one or more existing local system persons to the workspace. In block 1206, assuming that block 1204 is answered in the affirmative, the workspace-providing system 102 receives the user's selection of one or more local system persons. In block 1208, the workspace-providing system 102 adds these selected persons to the workspace. The operations described in blocks 1204-1208 can be implemented using a drag-and-drop procedure. In this procedure, the user may click on a name in the added person panel 502 and drag it to one of the permission-identification parts (406, 408, or 410) of the permissions UI presentation 402.

Assume that block 1204 is answered in the negative (e.g., the user does not want to add an existing local system person to the workspace at this time). In this case, in block 1210, the workspace-providing system 102 asks whether the user wishes to add an alternative system person to the workspace.

In block 1212, assuming that block 1210 is answered in the affirmative, the workspace-providing system 102 receives the user's selection of an alternative system. For example, as explained above with respect to FIG. 6, the user may select Social Network X as the alternative system.

In block 1214, the workspace-providing system 102 can present a collection of alternative system persons associated with the user in the context of the selected alternative system. One example of such a presentation is shown in FIG. 7.

In block 1216, the workspace-providing system 102 receives the user's selection of one or more alternative system persons. In the merely representative case of FIG. 7, the user has selected the group "Neighbors & Such."

In block 1218, the workspace-providing system 102 adds the selected alternative system person to the collection of the user's local system persons. The process then returns to block 1204, where it is determined whether the user now wants to add one or more local system persons to the workspace. Since the selected alternative system person have been imported and relabeled as local system persons, the user is now free to add these people to the workspace from the list of local system persons. Alternatively, the above process can be used to grant a single alternative system person membership status in the workspace.

C. Representative Processing Functionality

FIG. 13 sets forth illustrative electrical data processing functionality or equipment 1300 (simply "processing functionality" below) that can be used to implement any aspect of the functions described above. With reference to FIG. 1, for instance, the processing functionality 1300 can be used to implement the workspace-providing system 102 or any component thereof. With reference to FIG. 2, the processing functionality 1300 can also be used to implement any of the user electronic devices (202, 204, . . . 206). With reference to the same figure the processing functionality 1300 can also be used to implement any aspect of the alternative systems 210. The processing functionality 1300 may correspond to a general purpose computing device, a special purpose computing device, or any other implementation.

The processing functionality 1300 can include volatile and non-volatile memory, such as RAM 1302 and ROM 1304, as well as one or more processing devices 1306. The processing functionality 1300 also optionally includes various media devices 1308, such as a hard disk module, an optical disk module, and so forth. The processing functionality 1300 can perform various operations identified above when the processing device(s) 1306 executes instructions that are maintained by memory (e.g., RAM 1302, ROM 1304, or elsewhere). More generally, instructions and other information can be stored on any computer-readable medium 1310, including, but not limited to, static memory storage devices, magnetic storage devices, optical storage devices, and so on. The term "computer-readable medium" also encompasses plural storage devices. The term "computer-readable medium" also encompasses signals transmitted from a first location to a second location, e.g., via wire, cable, wireless transmission, etc. The term "logic" describes instructions for performing identified tasks; for example, the permissions management module 106 can be implemented by logic for managing permissions, and this logic may correspond to instructions associated with tasks performed by the permissions management module 106 as described above.

The processing functionality 1300 also includes an input/output module 1312 for receiving various inputs from a user (via input modules 1314), and for providing various outputs to the user (via output modules). One particular output mechanism may include a presentation module 1316 and an associated graphical user interface (GUI) 1318. The processing functionality 1300 can also include one or more network interfaces 1320 for exchanging data with other devices via one or more communication conduits 1322. One or more communication buses 1324 communicatively couple the above-described components together.

In closing, the description may have described various concepts in the context of illustrative challenges or problems. This manner of explication does not constitute an admission that others have appreciated and/or articulated the challenges or problems in the manner specified herein.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method executed at least in part in a computing device for managing permissions in a network environment, the method comprising:
   providing an interactive user interface through a display for enabling one or more users to collaborate on one or more items associated with a collaborative workspace in the network environment, wherein the collaborative workspace defines a linked collection of one or more of: members, permissions, items, activities, notifications, and messages and wherein items include one or more of: word processing document items, spreadsheet document items, presentation-related document items, data items, discussion items;
   displaying on the display a menu providing a plurality of available functions for interacting with the collaborative workspace provided by the interactive user interface, wherein the available functions include one or more of: a workspace option, a document option, a people option, and a message option;
   displaying on the display a list of users associated with the collaborative workspace on the interactive user interface;
   displaying on the display the one or more items associated with the collaborative workspace in an item display portion of the interactive user interface, wherein the workspace stores the items as one or more of: an actual copy included in the workspace and a virtual copy with a reference pointer pointing to where the items are stored;
   enabling a user with administrative rights to add and remove items from the collaborative workspace utilizing a workspace management module;
   displaying on the display tasks associated with the collaborative workspace in an activity management module on the interactive user interface for enabling the user with administrative rights to set up tasks for one or more users associated with the collaborative workspace;
   displaying on the display a message thread in a discussion management module on the interactive user interface for enabling the one or more users associated with the collaborative workspace to exchange messages;
   upon detection of a request through an input device from the user with administrative rights to manage permissions for the one or more users associated with the collaborative workspace, providing a permissions user interface in a separate window overlapping with the interactive user interface on the display without losing a context associated with the collaborative workspace for enabling the user with administrative rights to specify a permission level of one or more local users associated with the collaborative workspace and to add one or more alternative users associated with one or more alternative systems that are separate from the collaborative workspace to the workspace; and
   enabling the user with administrative rights to modify the permission level of one or more users on the displayed list of users through drag-and-drop operations on the permissions user interface on the display.

2. The method of claim 1, further comprising:
   identifying a permission level assigned to each of the one or more users associated with the collaborative workspace, wherein the permission level comprises one or more of:
   an owner permission level that identifies one or more owners associated with the collaborative workspace;
   an editor permission level that identifies one or more editors who are permitted to make changes to items associated with the collaborative workspace; and
   a viewer permission level that identifies one or more viewers who are permitted to view the items associated with the collaborative workspace, but not makes changes to the items associated with the collaborative workspace; and
   organizing the one or more users associated with the collaborative workspace into groups corresponding to each permission level; and
   displaying the groups of one or more users corresponding to each permission level in separate portions on the permissions user interface.

3. The method of claim 2, further comprising:
   enabling the user with administrative rights to modify the permission level assigned to a user by selecting on the display the user in a portion of the permissions user interface corresponding to a first permission level and performing a drag-and-drop operation to move the user into a portion of the permissions user interface corresponding to a second permission level.

4. The method of claim 2, further comprising:
   enabling the user with administrative rights to modify the permission level assigned to a user by selecting on the display to view additional information for the user in a portion of the permissions user interface corresponding to a first permission level and modifying the additional information to assign a second permission level to the user.

5. The method of claim 4, further comprising:
   upon detecting modification of the additional information on the display assigning a second permission level to the user, automatically moving the user from the portion of the permissions user interface corresponding to the first permission level to the portion of the permissions user interface corresponding to the second permission level.

6. The method of claim 1, further comprising:
   enabling the user with administrative rights to add a new user associated with the network environment to the collaborative workspace by:

receiving a request by the administrating user to add the new user to the collaborative workspace through an input device;

presenting another list of users who are associated with the user with administrative rights within the collaborative environment on the display;

receiving a selection of one or more of the users in the other list of users from the user with administrative rights;

in response to the selection, adding the one or more selected users to the collaborative workspace; and enabling the user with administrative rights to assign a permission level to the one or more users added to the collaborative workspace.

7. The method of claim 6, wherein adding the one or more selected users to the collaborative workspace further comprises:

displaying a selection option for the user with administrative rights to select a user from the other list of users and to perform a drag-and-drop operation to move the user into a portion of the permissions user interface corresponding to the permission level that the user with administrative rights desires to assign to the user.

8. The method of claim 7, wherein adding the one or more selected users to the collaborative workspace further comprises:

presenting another list of users who are associated with the user with administrative rights within an alternative system including a social networking system separate from collaborative workspace on the display;

receiving a selection of one or more of the users in the other list of users from the user with administrative rights;

in response to the selection, adding the one or more selected users to the collaborative workspace; and enabling the user with administrative rights to assign a permission level to the one or more users added to the collaborative workspace.

9. The method of claim 8, wherein the other list of users is presented in a separate window overlapping with the interactive user interface and the permissions user interface.

10. A computing device for providing an interactive user interface for managing permissions in a network environment, comprising:

a memory storing instructions; and a processor coupled to the memory, the processor configured to execute:

a workspace management module configured to:
  manage set-up and operation of a workspace; and
  employ a frontend interface component to present a workspace user interface to a user with administrative rights enabling the user with administrative rights to interact with a collaborative workspace within a context of the network, wherein the administrative rights with respect to the workspace include one or more of: set up, manage, and terminate the workspace;

an item management module configured to:
  enable the user with administrative rights to add and remove items from the collaborative workspace, wherein addition of an item to the collaborative workspace places the item in a shared location to be accessed and acted upon by members of the workspace in a manner defined by respective permissions of the members;

a presentation module coupled to the workspace management module, the presentation module configured to:
  display a menu providing a plurality of available functions for interacting with the collaborative workspace provided by the interactive user interface; and
  display a list of users associated with the collaborative workspace on the interactive user interface;

a permissions management module coupled to the presentation module, the permissions management module configured to:
  manage permissions associated with workspace members;
  upon detection of a request from a user with administrative rights to manage permissions for the one or more users associated with the collaborative workspace, provide a permissions user interface through the presentation module in a separate window overlapping with the interactive user interface without losing a context associated with the collaborative workspace; and
  enable the user with administrative rights to modify a permission level of one or more users through drag-and-drop operations on the permissions user interface;

an interface module configured to:
  couple the permissions management module to at least one alternative system; and
  enable the permissions management module to interact with the at least one alternative system retrieving a list of the one or more users whose rights are to be modified; and an activity management module configured to:
  enable the user with administrative rights to set up and assign one or more tasks to the one or more users associated with the collaborative workspace;
  display the one or more tasks assigned to the one or more users associated with the collaborative workspace;
  provide notifications and alerts regarding the status of the one or more tasks to the one or more users associated with the collaborative workspace; and
  enable the user with administrative rights to add a new user associated with an alternative system, wherein the alternative system is a processing environment that is physically implemented using a collection of data processing equipment for performing prescribed tests; and a discussion management module configured to display a message thread for enabling the one or more users associated with the collaborative workspace to exchange messages, reply to an existing message, and start a new message thread.

11. The computing device of claim 10, wherein the permissions management module is further configured to:

identify a permission level assigned to each of the one or more users associated with the collaborative workspace; wherein the permission level comprises one or more of:
  an owner permission level that identifies one or more owners associated with the collaborative workspace;
  an editor permission level that identifies one or more editors who are permitted to make changes to items associated with the collaborative workspace; and
  a viewer permission level that identifies one or more viewers who are permitted to view the items of associated with the collaborative workspace, but not makes changes to the items associated with the collaborative workspace; and organize the one or more users associated with the collaborative workspace into groups corresponding to each permission level;

display the groups of one or more users corresponding to each permission level in separate portions on the permissions user interface; and enable the user with administrative rights to modify the permission level assigned to a user by selecting the user in a portion of the permissions user interface corresponding to a first permission level and performing a drag-and-drop operation to move the user into a portion of the permissions user interface corresponding to a second permission level.

12. The computing device of claim 10, wherein the permissions management module is further configured to:
enable the user with administrative rights to add a new user associated with an email system within the network environment to the collaborative workspace by:
receiving a request by the administrating user to add the new user to the collaborative workspace;
presenting another list of users who are associated with the email system;
receiving a selection of one or more of the users in the other list of users from the user with administrative rights;
in response to the selection, adding the one or more selected users to the collaborative workspace; and
enabling the user with administrative rights to assign a permission level to the one or more users added to the collaborative workspace.

13. The computing device of claim 10, wherein the permissions management module is further configured to:
enable the user with administrative rights to add a new user associated with a social network to the collaborative workspace by:
receiving a request by the administrating user to add the new user to the collaborative workspace;
presenting another list of users who are associated with the social network associated with the user with administrative rights;
receiving a selection of one or more of the users in the other list of users from the user with administrative rights;
in response to the selection, adding the one or more selected users to the collaborative workspace; and
enabling the user with administrative rights to assign a permission level to the one or more users added to the collaborative workspace.

14. The computing device of claim 13, wherein the other list of users is displayed on a panel adjacent to a permission level panel on the permissions user interface.

15. The computing device of claim 13, wherein the permissions management module is further configured to:
display a selection option for the user with administrative rights to sign in to the social network prior to retrieving the other list of users.

16. The computing device of claim 10, wherein the permissions management module is further configured to:
enable the user with administrative rights to import a plurality of new users associated with one of an email system with the network environment and a social network associated with the user with administrative rights to the collaborative workspace through single user interface.

17. A computer-readable memory device with instructions stored thereon for providing an interactive user interface for managing permissions in a collaborative environment, the instructions comprising:
providing an interactive user interface through a display viewable on a plurality of electronic devices accessible over a network for enabling one or more users to collaborate on one or more items associated with a collaborative workspace in the network environment, wherein at least a portion of a functionality and information provided on the interactive user interface are implemented on a local device and at least a portion of a functionality and information provided on the interactive user interface are implemented at a network accessible location;
displaying on the display a menu providing a plurality of available functions for interacting with the collaborative workspace provided by the interactive user interface, wherein the collaborative workspace defines a linked collection of one or more of: members, permissions, items, activities, notifications, and messages and wherein items include one or more of: word processing document items, spreadsheet document items, presentation-related document items, data items, discussion items;
displaying on the display a list of users associated with the collaborative workspace on the interactive user interface via a workspace management module;
displaying on the display the one or more items associated with the collaborative workspace in an item display portion of the interactive user interface, wherein the workspace stores the items as one or more of: an actual copy and a virtual copy with a reference pointer pointing to where the items are stored;
enabling a user with administrative rights to add and remove items from the item display portion utilizing an item management module, wherein addition of an item to the collaborative workspace places the item in a shared location to be accessed and acted upon by members of the workspace in a manner defined by respective permissions of the members;
enabling the user with administrative rights to add a new user associated with an alternative system, wherein the alternative system is a processing environment that is physically implemented using a collection of data processing equipment for performing prescribed tests including an email system and a social network;
displaying on the display one or more tasks assigned to one or more users associated with the collaborative workspace in an activity management module on the interactive user interface and providing notifications to the one or more users associated with the collaborative workspace related to the status of the one or more tasks;
displaying on the display a message thread in a discussion management module on the interactive user interface for enabling the one or more users associated with the collaborative workspace to exchange messages; and
upon detection of a request through an input device from the user with administrative rights to manage permissions for the one or more users associated with the collaborative workspace, providing a permissions user interface in a separate window overlapping with the interactive user interface on the display without losing a context associated with the collaborative workspace;
enabling the user with administrative rights to modify a permission level of one or more users on the displayed list of users through drag-and-drop operations on the permissions user interface by:
identifying a permission level assigned to each of the one or more users associated with the collaborative workspace, wherein the permission level comprises one or more of:
an owner permission level that identifies one or more owners associated with the collaborative workspace;
an editor permission level that identifies one or more editors who are permitted to make changes to items associated with the collaborative workspace; and a viewer permission level that identifies one or more viewers who are permitted to view the items associated with the collaborative workspace, but not makes changes to the items associated with the collaborative workspace; and organizing the one or more users associated with the collaborative workspace into groups corresponding to each permission level; and displaying on the display the groups of one or more users corresponding to each permission level in separate portions on the permissions user interface.

18. The computer-readable memory device of claim 17, wherein the instructions further comprise:

enabling the user with administrative rights to add a new user associated with one of an email system with the network environment and a social network associated with the user with administrative rights to the collaborative workspace by:

receiving a request by the administrating user to add the new user to the collaborative workspace;

presenting another list of users who are associated with one of the email system with the network environment and the social network associated with the user with administrative rights;

receiving a selection of one or more of the users in the other list of users from the user with administrative rights;

in response to the selection, adding the one or more selected users to the collaborative workspace; and enabling the user with administrative rights to assign a permission level to the one or more users added to the collaborative workspace through a drag-and-drop operation.

19. The computer-readable memory device of claim 17, wherein the instructions further comprise:

enabling the user with administrative rights to sign in to one of the email system and the social network prior to retrieving the other list of users; and displaying the other list of users on a panel adjacent to a permission level panel on the permissions user interface.

* * * * *